UNITED STATES PATENT OFFICE.

HENRY BLUMENBERG, JR., OF ORO GRANDE, CALIFORNIA, ASSIGNOR TO GOLDEN STATE PORTLAND CEMENT COMPANY, OF LOS ANGELES, CALIFORNIA, A CORPORATION OF CALIFORNIA.

FERTILIZER.

1,270,688. Specification of Letters Patent. Patented June 25, 1918.

No Drawing. Application filed March 4, 1918. Serial No. 220,369.

*To all whom it may concern:*

Be it known that I, HENRY BLUMENBERG, Jr., a citizen of the United States, residing at Oro Grande, in the county of San Bernardino and State of California, have invented new and useful Improvements in Fertilizers, of which the following is a specification.

My invention relates to a fertilizer.

It is a well known fact that many soils in southern California, and elsewhere are deficient in lime contents. The necessary lime is supplied by adding calcium carbonate or calcium sulfate or gypsum. The calcium carbonate has certain advantages namely, it can, as a rule, be purchased for less money per ton and it contains a greater percentage of calcium oxid, but it has the disadvantage that it will not fix nitrogen in the form of ammonia on account of the volatility of the ammonium compound formed, namely ammonium carbonate.

The calcium sulfate has the advantage that it will fix nitrogen as ammonium sulfate, but as a rule, it costs more per ton than calcium carbonate, and it also contains a smaller percentage of calcium oxid than the commercial calcium carbonate. Consequently, when calcium sulfate is used as a fertilizer, the expense is greater than when calcium carbonate is used. As an illustration, calcium sulfate at the present time, in southern California, costs from one to two dollars more per ton than the calcium carbonate, and as the two calcium compounds mentioned are used principally for the free calcium oxid they contain, a superior result is obtained by mixing the two calcium compounds.

My invention consists in the new fertilizer hereinafter described and claimed.

I take one ton of ground calcium sulfate and mix the same with two or three tons of ground calcium carbonate. This mixture answers all the plant requirements. The soil is properly limed and enough calcium sulfate is present to fix free ammonia, while the cost of the fertilizer is kept below the cost of gypsum.

I claim:

1. A fertilizer consisting of ground calcium carbonate and calcium sulfate.

2. A fertilizer consisting of calcium carbonate, three parts, and calcium sulfate one part.

In testimony whereof I have signed my name to this specification.

HENRY BLUMENBERG, JR.